May 7, 1940.   V. A. DE VULITCH   2,200,162
METHOD OF MANUFACTURING GAS BOTTLES
Filed Sept. 17, 1937
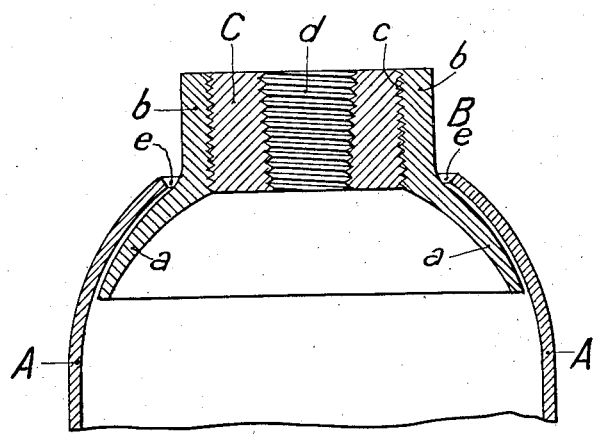
V. A. de Vulitch
INVENTOR
By: Glascock Downing & Seebold
Attys.

Patented May 7, 1940

2,200,162

UNITED STATES PATENT OFFICE 2,200,162

METHOD OF MANUFACTURING GAS BOTTLES

Vladimir Antoine de Vulitch, Paris, France

Application September 17, 1937, Serial No. 164,414
In France September 19, 1936

3 Claims. (Cl. 29—148.2)

The present invention relates to gas bottles or containers for compressed gases and a method of making such receptacles.

It is known that for the manufacture of gas bottles, it is most usual to start with a mass of metal which is pierced, pressed, and then elongated and the end contracted and driven back to thus form the necessary neck. By this classical method bottles are obtained, which are usually made of steel, having thick and rather uneven walls, the minimum thickness of the walls being about four millimeters.

In the other methods of manufacture, the problem of forming the neck portion arises. The difficulties to which it gives rise have not hitherto been practically solved.

In the manufacture of gas bottles made of welded sheet steel, the starting material is a steel sheet formed into a cylinder or pressed into shells and welded with an oxy-hydrogen blow pipe; bottles of variable thicknesses are obtained, but which only withstand low pressures owing to the modifications produced in the composition of the surrounding metal by the autogenous welding.

In the manufacture of gas bottles from weldless tube, it is always necessary to weld at least one of the two caps of the bottle, a fact which involves the foregoing drawback.

In the manufacture of bottles welded by electric welding with a roller under pressure and by lap welding, it appears that a weld can be obtained which does not deteriorate the surrounding metal; but as it is impossible to pass an electrode into the body of the bottle, it is not possible to weld separate neck forming members in this manner. A weld made on the outside is in tearing stress and cannot hold.

The difficulties and the drawbacks of welding increase moreover with the diameter of the bottle and in inverse ratio to the thickness of the metal sheet.

In the manufacture of gas bottles made of tube use is made of machines for contracting the tube by hot hammering. The drawback of this method, whether it be carried out by hand or by machine, resides in the large amount of metal necessary to obtain the neck; the operation is limited by the ratio between the thickness of the tube and the diameter of the neck.

The present invention avoids these drawbacks and eliminates these difficulties. It has for its object a method of manufacturing gas bottles which is characterized by the fact that the neck of the bottle is formed by fitting together two elements of corresponding shape, the outer element forming the base of the ogive and the inner element, which forms the apex of the ogive, carrying the neck of the bottle.

In this manner, the internal pressure of the bottle tends to press the two component elements of the neck against each other. Means are provided for holding the two elements relatively to each other as well as a sealing device. A simple beading of welding metal can play this dual part.

The outer element forming the base of the neck can be made from the tube forming the body of the bottle. It can also be fixed on to said body. In this case it can advantageously be secured to the body of the bottle by electric welding; its large orifice enables an electrode to be inserted inside the bottle, the weld thus effected giving every desirable guarantee of strength. It is only after said weld has been effected that the inner element carrying the neck is placed in position; of course, this latter element has been previously introduced into the bottle.

In the accompanying drawing the end of a bottle constructed by applying the method of the invention is shown by way of example.

The tubular body of the bottle is contracted or pressed in such a manner as to form a considerably truncated collar A, of the same thickness as the tubular wall. Said collar forms the outer element of the neck.

The inner element B comprises a flange member $a$ which bears on the collar A, and the flange member is provided with a neck $b$. This latter is internally threaded at $c$ to accommodate a plug C, which can be tapped in the usual manner at $d$. A beading of welding metal is provided at $e$ for sealing.

I claim:

1. A method of manufacturing gas bottles for relatively high pressures from a tube open at one of its ends which comprises, arranging a flange member having a neck portion with a wide mouth in the interior of the tube, curving the end of the tube embracing the flange inwardly, applying to the inner face of the end of the tube a curvature corresponding to the outer face of the flange member to provide a joint between the tube and the flange member which is tightened by pressure within the tube, depositing a bead of welding metal at the outer juncture of the end of the tube and the flange member, threading the mouth of neck portion and filling said mouth with an apertured tapped plug.

2. A method of manufacturing gas bottles for relatively high pressures from a tube having at least one open cylindrical end which comprises, inserting in the interior of the tube a member having a curved flange and an integral apertured neck forming a wide mouth, bending the open cylindrical end inwardly so that its inner face is curved to correspond to the outer face of the flange, joining said member to the tube by electric welding wherein one of the electrodes is inserted through the mouth of the member, whereby the outer face of the flange member bears against the inner face of the tube to provide a joint between the tube and the flange member which is tightened by pressure within the tube, depositing a bead of welding metal at the outer juncture of the end of the tube and the flange member, threading the wide mouth of neck portion, and inserting an apertured threaded plug in said mouth.

3. A method of manufacturing gas bottles for relatively high pressures from a tube having at least one open end which comprises, inserting in the interior of the tube a member having a curved flange and an integral apertured neck, bending the end of the tube inwardly so that the inner face of the tube is curved to correspond to the outer face of the flange, depositing a bead of welding metal at the outer juncture of the tube end and the flange member, and fitting a tapped plug in the aperture of the neck.

VLADIMIR ANTOINE DE VULITCH.